(12) United States Patent
Tuma et al.

(10) Patent No.: US 7,166,142 B2
(45) Date of Patent: Jan. 23, 2007

(54) FILTER CONSTRUCTIONS CONTAINING BREATHER AND RECIRCULATION FILTER ELEMENTS

(75) Inventors: Daniel L. Tuma, St. Paul, MN (US); Randy J. Logan, St. Paul, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 197 days.

(21) Appl. No.: 10/750,530

(22) Filed: Dec. 31, 2003

(65) Prior Publication Data

US 2005/0139078 A1 Jun. 30, 2005

(51) Int. Cl.
  *G11B 33/14* (2006.01)
  *B01D 53/04* (2006.01)
(52) U.S. Cl. .................. 55/385.6; 96/134; 96/147; 360/97.02
(58) Field of Classification Search ............... 55/385.1, 55/385.4, 385.6, 385.7, 516, DIG. 5; 96/134, 96/135, 139, 147, 152–154; 360/97.02, 97.03, 360/97.04; 361/690–694
See application file for complete search history.

(56) References Cited

U.S. PATENT DOCUMENTS

| | | | |
|---|---|---|---|
| 4,329,722 A * | 5/1982 | West .................. | 360/97.03 |
| 4,617,122 A | 10/1986 | Kruse et al. | |
| 4,863,499 A | 9/1989 | Osendorf | |
| 5,030,260 A * | 7/1991 | Beck et al. .................. | 96/139 |
| 5,391,426 A | 2/1995 | Wu | |
| 5,417,743 A | 5/1995 | Dauber | |
| 5,447,695 A * | 9/1995 | Brown et al. ............... | 422/171 |
| 5,500,038 A | 3/1996 | Dauber et al. | |
| 5,538,545 A | 7/1996 | Dauber et al. | |
| 5,593,482 A | 1/1997 | Dauber et al. | |
| 5,869,009 A | 2/1999 | Bellefeuille et al. | |
| 5,876,487 A | 3/1999 | Dahlgren et al. | |
| 5,916,671 A | 6/1999 | Dauber et al. | |
| 5,980,616 A | 11/1999 | Johnson et al. | |
| 5,997,614 A | 12/1999 | Tuma et al. | |
| 5,997,618 A | 12/1999 | Schneider et al. | |
| 6,077,335 A | 6/2000 | Schneider et al. | |
| 6,143,058 A | 11/2000 | Dahlgren et al. | |
| 6,143,675 A | 11/2000 | McCollam et al. | |
| 6,146,446 A | 11/2000 | Tuma et al. | |
| 6,168,651 B1 | 1/2001 | Tuma et al. | |
| 6,168,681 B1 | 1/2001 | Bellefeuille et al. | |
| 6,196,708 B1 | 3/2001 | Rogers | |

(Continued)

FOREIGN PATENT DOCUMENTS

WO   WO 97/00717   1/1997

*Primary Examiner*—Frank M. Lawrence
(74) *Attorney, Agent, or Firm*—Pauly, DeVries Smith & Deffner, L.L.C.

(57) ABSTRACT

Filters and filtering methods for placement in an electronic enclosure, such as a hard disk drive housing, are disclosed. In one embodiment the filter includes a housing having a top, a base, and at least one sidewall extending from the top to the base, the housing defining an inlet port and an outlet port through the sidewall, and a breather port in the base, the housing further defining an internal volume. Adsorbent filter media is disposed within the internal volume of the housing such that the housing defines a first path for flow of fluid through the breather port in the base to the filter media and a second path for flow of fluid through the inlet port, into contact with the filter media, and out the outlet port.

17 Claims, 12 Drawing Sheets

U.S. PATENT DOCUMENTS

| | | |
|---|---|---|
| 6,208,484 B1 * | 3/2001 | Voights .................. 360/97.02 |
| 6,214,095 B1 | 4/2001 | Logan et al. |
| 6,238,467 B1 | 5/2001 | Azarian |
| 6,266,208 B1 * | 7/2001 | Voights .................. 360/97.02 |
| 6,296,691 B1 | 10/2001 | Gidumal |
| 6,395,073 B1 * | 5/2002 | Dauber ....................... 96/134 |
| 6,475,269 B1 * | 11/2002 | Turner ........................ 96/134 |
| 6,491,741 B1 | 12/2002 | Tuma et al. |
| 6,582,113 B1 | 6/2003 | Rogers |
| 2002/0063990 A1 * | 5/2002 | Hirasaka et al. ......... 360/97.02 |
| 2002/0075590 A1 * | 6/2002 | Garikipati et al. ....... 360/97.02 |
| 2002/0089781 A1 * | 7/2002 | Tuma ...................... 360/97.02 |
| 2004/0261378 A1 * | 12/2004 | Garikipati et al. ......... 55/385.6 |
| 2005/0024763 A1 * | 2/2005 | Ng et al. ................. 360/97.02 |
| 2005/0047001 A1 * | 3/2005 | Logan ..................... 360/97.02 |

\* cited by examiner

FILTER CONSTRUCTIONS CONTAINING BREATHER AND RECIRCULATION FILTER ELEMENTS

FIELD OF THE INVENTION

The present invention relates to filter constructions and to methods for making and using the filter constructions. More particularly, the filter constructions combine the advantages of a recirculation filter and a breather filter in one filter housing.

BACKGROUND OF THE INVENTION

Filters are useful in a variety of contexts. For example, filters are often used in electrical or optical equipment. An air pressure differential between the interior and exterior of a housing containing the equipment can be produced as the electrical or optical equipment heats and cools. Often the housing includes a vent to allow air flow that equalizes the pressure. A filter is typically provided over the vent to reduce the flow of contaminants into the housing.

Computer disk drives, and in particular, hard disk drives, are one example of a device that uses filters in this manner. Disk drives are sensitive to moisture, chemical contamination, and particulate contamination, particularly, as the drive heads become smaller and aerial densities increase. Chemical contaminants, such as hydrocarbons and acid gases, can condense onto a disk and degrade the head/disk interface and corrode the heads. Particulate contaminants can lead to stiction and can cause read/write errors and head crashes.

It has been found that particulate and gaseous contaminants act to reduce efficiency and longevity of hard disk drives. Common sources of contaminants in disk drives include leaks (which may or may not be intentional), the manufacturing environment, and the materials incorporated into the disk drive which give off particulates and gases. It is of particular concern that organic vapors can be generated inside disk drive enclosures during normal operating conditions when, for example, the temperature exceeds 150° F. (about 65° C.). Such temperatures can be achieved by simply leaving the computer in the trunk of a car on a hot day or during operation.

Breather and recirculation filters have been used in hard disk drives for removing contaminates. Typically, recirculation filters have been included to remove unwanted particulates. They are not, however, typically suitable for removing organic vapors since they do not have a capacity for permanently adsorbing organic vapors. To provide enhanced organic vapor removal, activated carbon or other adsorbent material has been used in recirculation filters as well as breather filters. For example, activated carbon in the form of granules or fiber can adsorb and remove organic vapors from the air within a disk drive housing.

SUMMARY OF THE INVENTION

Generally, the present invention relates to filters for placement in an electronic enclosure, such as a hard disk drive housing. In one embodiment the filter includes a housing having a top, a base, and at least one sidewall extending from the top to the base. The housing contains an inlet port and an outlet port through the sidewall, and a breather port in the base. The housing further defines an internal volume. Adsorbent filter media is disposed within the internal volume of the housing such that the housing defines two paths: a first path for flow of fluid through the breather port in the base to the filter media, and a second path for flow of fluid through the inlet port, into contact with the filter media, and out the outlet port.

The housing typically comprises a non-porous material with a microporous membrane disposed over the breather port. The microporous membrane can be, for example, a polytetrafluoroethylene membrane. A microporous membrane is also typically disposed over the outlet port. This microporous membrane can also be a polytetrafluoroethylene membrane.

A mounting adhesive may also be disposed on the base and is used to hold the filter in place within an electronic enclosure. The base can also include a diffusion channel forming a path for fluid flow through the breather port to the filter medium. The filter media comprises, for example, carbon filter material. Also, a porous support layer can be disposed within the internal volume, and the filter media may be mounted on the porous support layer.

The invention is also directed to an electronic enclosure assembly that contains an enclosure defining a vent opening. A disk (such as a disk from a disk drive) is rotatably mounted within the enclosure and a filter construction is positioned within the enclosure. The filter construction comprises a housing having a top, a base, and at least one sidewall extending from the top to the base, the housing defining an inlet port and an outlet port through the at least one sidewall, and a breather port in the base wherein the breather port is disposed over the vent opening of the enclosure, the housing further defining an internal volume. Adsorbent filter media is disposed within the internal volume of the housing. Typically the housing also defines a first path for flow of fluid through the breather port in the base to the filter media and a second path for flow of fluid through the inlet port, into contact with the filter media, and out the outlet port.

Further, the invention is directed to methods of removing contaminants from an electronic enclosure assembly, the method comprising positioning a filter construction of the invention into an electronic enclosure to remove contaminants from within the enclosure and also to prevent contaminants from entering the enclosure.

The above summary of the present invention is not intended to describe each disclosed embodiment or every implementation of the present invention. The Figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 8b is a bottom view of the filter shown in FIG. 8a.

Figure 1:
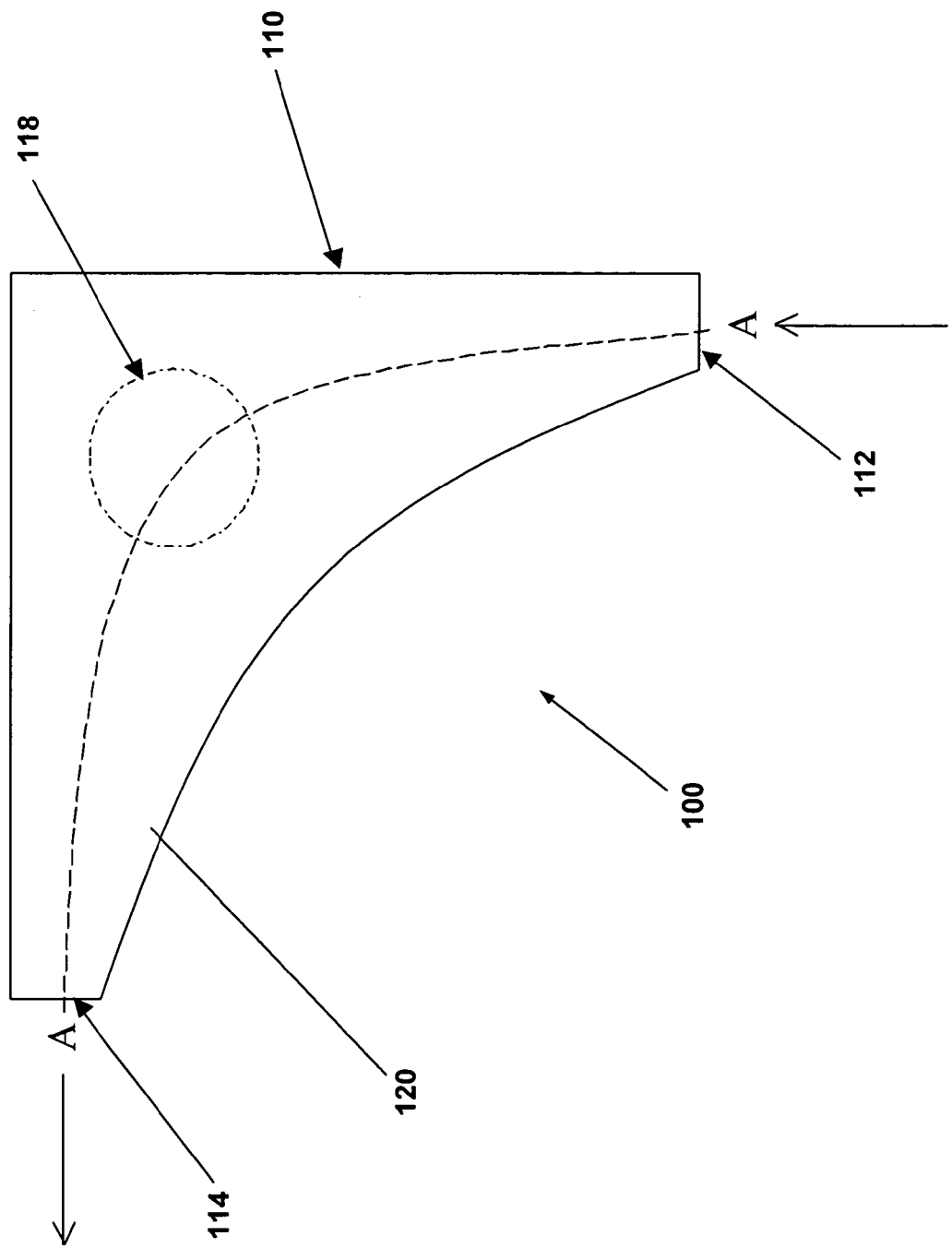
FIG. 1 is a schematic top view of one embodiment of a filter construction, according to the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE PREFERRED EMBODIMENT

The present invention is applicable to filters and methods of making and using filters to filter a fluid, such as, for example, air or other gases. In addition, the present invention is directed to combining a breather filter and recirculation filter into a single filter construction, and methods of making and using these filter constructions. While the present invention is not so limited, an appreciation of various aspects of the invention will be gained through a discussion of the examples provided below.

The filter construction can reduce contaminants within an electronic enclosure, such as disk drive housing, by a variety of processes. A first process for reducing, removing, or preventing contamination within the disk drive housing is to reduce or remove contaminants entering the disk drive housing from regions outside of the disk drive housing (or other device). The breather filter aspect of the filter construction is constructed for this purpose. A second process for reducing, removing or preventing contamination from within the disk drive housing is to reduce or remove contaminants present in the disk drive housing atmosphere. The recirculation aspect of the filter construction is constructed for this purpose.

The filter construction generally includes a particulate or solid contaminant removal element and also includes a chemical removal element. Examples of particulate or solid contaminant removal elements include, but are not limited to, filter materials such as polymers, non-woven materials, fibers, paper, and the like. Examples of chemical removal elements include, but are not limited to, adsorbent elements and filters. Additionally or alternatively, a tortuous or extended path, such as a diffusion channel, can be used to restrict chemical entry.

It should be appreciated that in the context of this invention the reference to the "reduction" or "removal" of contaminants refers to the clarification of a fluid (e.g., gas or liquid) being filtered. The fluid being clarified in a hard disk drive enclosure is typically an air stream. It should be appreciated, however, that streams of other gases or liquids could also be clarified by the filter construction of the present invention. The reduction or removal of contaminants from a liquid or gas stream by a filter construction can also be referred to as entrapment, immobilization, adsorption, absorption, or otherwise binding (e.g., by covalent, ionic, coordinative, hydrogen, or Van der Waals bonds, or combinations thereof) of the contaminants inside or on the surface of the filter construction.

Filter Construction

Figure 2:
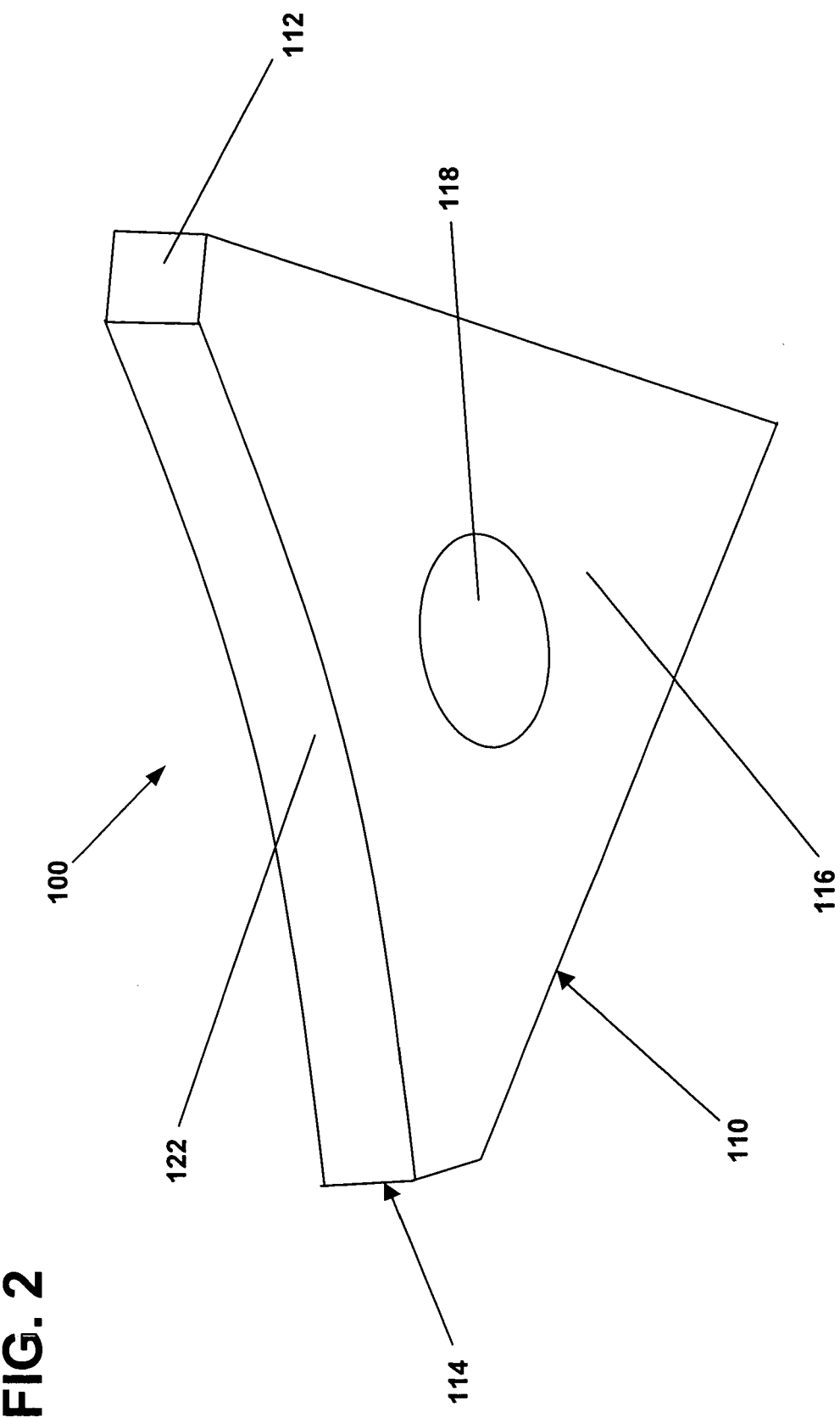
FIG. 2 is a schematic bottom perspective view of the filter construction of FIG. 1.

Referring to FIGS. 1 and 2, a filter assembly 100 includes a filter housing 110 that defines paths for the combination of a breather filter and a recirculation filter to remove contaminants in a disk drive. Arrows show fluid entering the filter assembly 100 through an inlet port 112, defined by the housing 110, and exiting the filter assembly 100 through an outlet port 114. Further, as illustrated in FIG. 2, a base 116 of the filter housing 110 defines a breather port 118 (shown in FIG. 1 as phantom lines). Although FIG. 1 depicts the breather port 118 as generally a circular shape, the breather port can have any shape. Further, FIGS. 1 and 2 show only one embodiment of the shape of the filter assembly 100. The shape of the filter can be modified to, for example, fit within a particular space in the disk drive housing, optimize the filtering and removal of contaminants, optimize flow of fluid through the filter, or any combination of these factors.

Combining the operation of a breather filter and a recirculation filter into one filter assembly 100 can reduce the amount of overall space required to filter air within a disk drive with two separate filters. By using one filter, various other advantages can be achieved, if desired. For example, having a single unit rather than two separate units can decrease manufacturing costs. This decreases the cost associated with manufacturing the unit (one piece versus two pieces) and decreases the time and cost associated with assembly of the disk drive because only one unit needs to be placed within disk drive housing. The reduction in space can allow the single filter to be increased in size and provide a greater overall amount and surface area for materials (e.g., adsorbents or particulate filters) that remove contaminants from the fluid in the disk drive.

Figure 3:
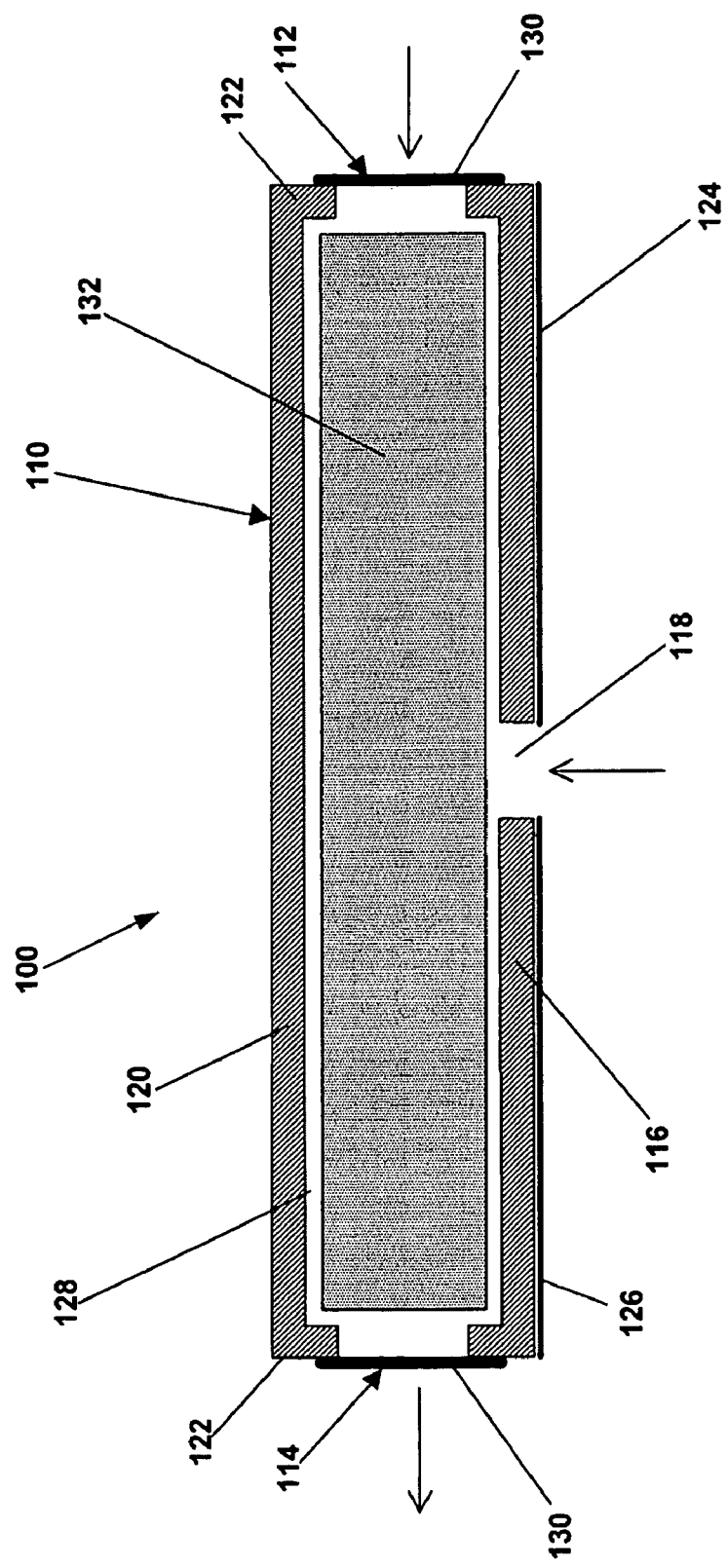
FIG. 3 is a schematic cross-sectional view along line A—A of the filter construction of FIG. 1.

FIG. 3 schematically portrays a cross-sectional view, along line A—A of FIG. 1, of one embodiment of the filter assembly 100. The filter housing 110 includes a top 120, a base 116, and at least one sidewall 122. The sidewall(s) 122 extends from the top of the housing 110 to the base 116 of the housing 110 except when an opening is provided in the sidewall(s). Optionally, the filter can be positioned in the disk drive with the disk drive housing providing at least one sidewall for the filter. A mounting adhesive 124 can be disposed on the outer surface 126 of the base 116 to adhere the filter assembly 100 to the disk drive housing.

The housing 110 defines the inlet port 112, the outlet port 114, the breather port 118 and an internal volume 128. The inlet port 112 and the outlet port 114 provide fluid communication between the internal volume 128 of the housing 110 and the internal volume of the disk drive or other device. Generally, a microporous membrane 130 is disposed over at least one of, and typically both, the inlet port 112 and the outlet port 114. The microporous membrane 130 allows fluid to flow into and out of the internal volume 128 of the housing 110, retains materials disposed within the internal volume 128, and optionally removes particulates from fluid entering the interior volume 128 of filter assembly 100.

The housing 110 also defines a path through the breather port 118 to permit flow of fluid from outside the disk drive or other device and into contact with adsorbent media 132 disposed within the internal volume 128 of the housing 110.

Figure 4:
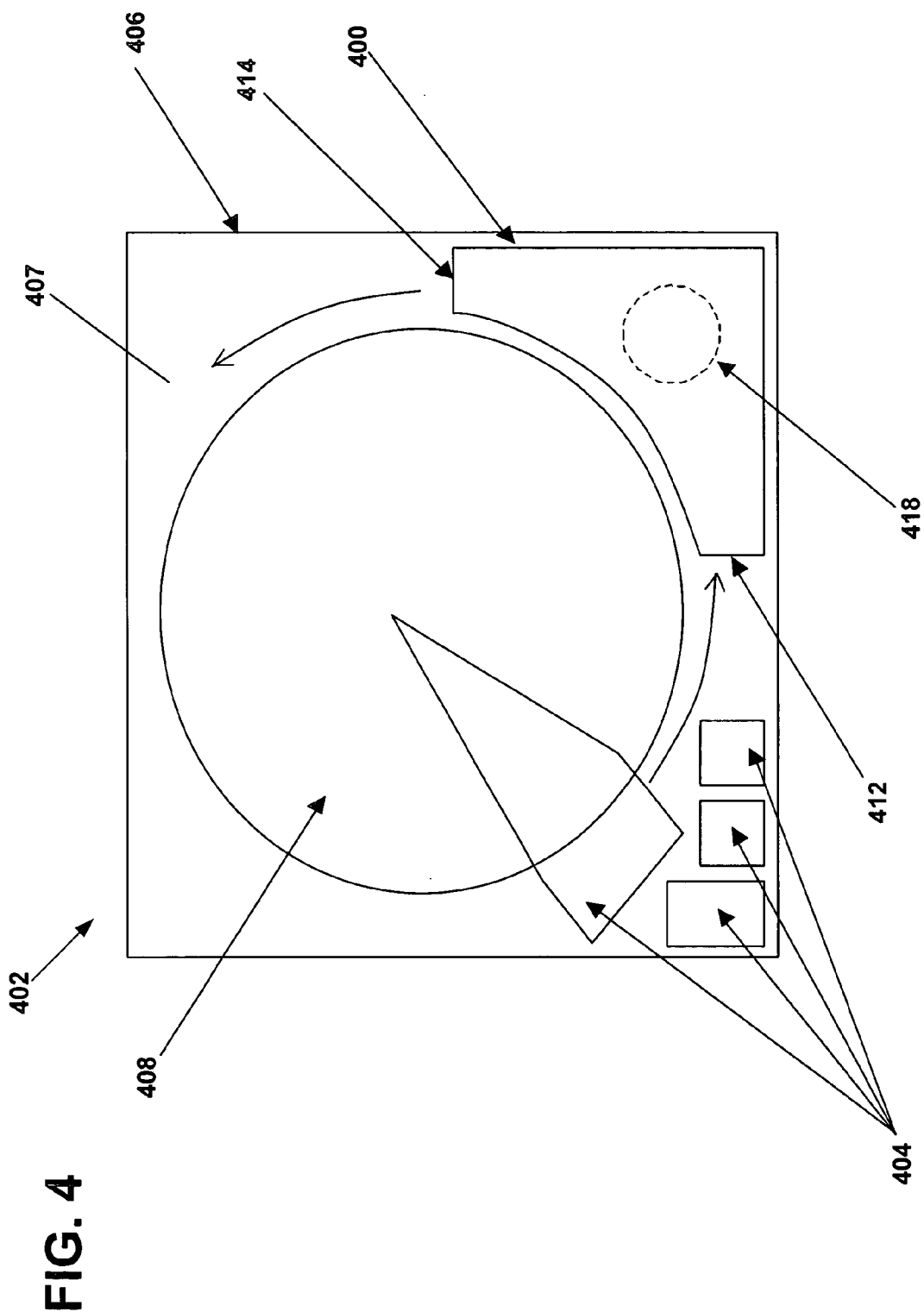
FIG. 4 is a schematic drawing of the top view of an electronic enclosure incorporating the filter construction of FIG. 1.

Referring to FIG. 4, as an example of operation of a filter 400 (such as the filter of FIGS. 1, 2, and 3), a device, such as a disk drive 402, includes electronic or other components 404 in a disk drive housing 406. A filter 400 is shown disposed within the disk drive housing 406 that protects the disk drive 402 from particulates and harmful vapors. The disk drive housing 406 typically defines at least one port 418, shown in phantom lines, through which air (or another fluid, such as nitrogen or helium) can flow. The filter 400 is typically placed on an internal surface of the disk drive housing 406. Air flows through the port 418, into the filter 400, and then into the internal volume 407 of the disk drive housing 406. Although fluid flow is indicated in a particular direction, it will be understood that air also flows along a reversed path to exit the internal volume of the disk drive housing.

In addition, air within the disk drive housing 406 can also be recirculated through the filter 400. The recirculation aspect of the filter 400 is adapted to remove or reduce contaminants present or generated within the disk drive housing 406. The filter 400 is placed near a disk 408 on the inside of the disk drive 402, such that an inlet port 412 is positioned near the disk 408. The electronic and mechanical components 404 are located adjacent to or positioned over the disk 408. An arrow is shown on FIG. 4 to illustrate airflow effects due to rotation of the disk 408 within the disk drive 402. Air flows through the inlet port 412, into the filter 400, and flows out through an outlet port 414 and into the internal volume 407 of the disk drive housing 406.

The filter 400 can be held in the disk drive housing 406 by mechanical or adhesive techniques. For example, clips, a frame, or other structures can support the filter 400 onto a surface of the disk drive housing 406. Any supports can be provided around the filter and are optionally separable from the enclosure. If desired, the filter 400 can be welded to the frame or "fit" in place. Pins can be used to secure the filter 400 to protrusions on or depressions in the surface. Double sided tape or other adhesive can be used as an adhesive attachment system, as can a carrier having an adhesive coated onto a surface.

Referring to FIG. 3, a mounting adhesive 124 can be disposed on or applied to, for example, the housing 110. As shown by example in FIG. 3, the mounting adhesive 124 is applied to the outer surface 126 of the base 116 to adhere the filter assembly 100 to the disk drive housing. The mounting adhesive 124 can be a single layer of adhesive. In some embodiments, the mounting adhesive 124 (e.g., a double-sided tape) forms the base 116 of the housing 110 and defines the breather port 118.

The mounting adhesive 124 can be disposed on the appropriate surface by, for example, coating, painting, spraying, dipping, or otherwise applying the adhesive to the surface. In some embodiments, mounting adhesive 124 can be pre-applied on a commercially available film. The mounting adhesive 124 can also be double-sided adhesive film that includes an adhesive carrier with adhesive disposed on both sides. The adhesive carrier is typically a polymer film, such as, for example, a polyethylene, polypropylene, polyester, polycarbonate, polyurethane, or polyvinyl chloride film.

The mounting adhesive 124 can include permanent, semi-permanent, or temporary adhesives. The mounting adhesive 124 can be permeable to the fluid to be filtered or the adhesive can be non-permeable. Examples of suitable adhesives include epoxies, resins, pressure-sensitive adhesives, hot-melt adhesives, solvent-based adhesives, emulsion-based adhesives, and contact adhesives. One example of a suitable commercial adhesive is 3M 502FL adhesive from 3M Co. (St. Paul, Minn.).

In some embodiments, the mounting adhesive 124 is a low out-gassing adhesive. Out-gassing includes the release or production of gaseous or other contaminants by the adhesive. Out-gassing by an adhesive or other component of the filter can produce additional contaminants that are often introduced into the fluid and removed by the adsorbent media 132. Contamination of the fluid by adhesive out-gassing can also be decreased by reducing, and, preferably, minimizing, the exposure of the fluid flowing through the filter assembly 100 to the mounting adhesive 124. Preferably, adhesives are chosen which meet ASTM E-595-84 specifications with 1% or less total mass loss and 0.1% or less collected volatile condensable material. This, however, is not necessary to the invention. The mounting adhesive 124 of the filter assembly 100 can have a thickness that ranges from, for example, 15 µm to 150 µm.

Filter Media and Filter Media Support

Typically, the adsorbent media 132 is disposed within the internal volume 128 of the housing 110. The adsorbent media 132 can be any suitable media for the removal of contaminants. Optionally, the filter media is mounted or otherwise disposed on the base of the filter housing, optionally using a mounting adhesive to adhere the filter media to the housing.

The adsorbent media 132 is typically provided for the removal of chemical contaminants. The adsorbent media 132 generally removes contaminants from the air entering the enclosure atmosphere by either adsorption or absorption. As used throughout this application, the terms "adsorb", "adsorption", "adsorbent" and the like, are intended to also include the mechanism of absorption. Typically, the adsorbent media 132 is selected to be stable and adsorb contaminants within normal disk drive operating temperatures, for example, within a range of about 10° C. to 50° C.

The adsorbent media 132 adsorbs one or more types of contaminants, including, for example, water, water vapor, acid gas, and volatile organic compounds. The filter media typically includes a physisorbent or chemisorbent material, such as, for example, a desiccant (i.e., a material that adsorbs or absorbs water or water vapor) or a material that adsorbs or absorbs volatile organic compounds, acid gas, or both. Suitable adsorbent materials include, for example, activated carbon, impregnated carbon, activated alumina, molecular sieves, silica gel, and silica. These materials or a non-adsorbent substrate can be combined with or impregnated with, for example, potassium permanganate, calcium carbonate, potassium carbonate, sodium carbonate, calcium sulfate, or mixtures thereof. Although adsorbent media 132 can be a single adsorbent material, mixtures of materials are also useful, for example, silica gel can be blended with carbon particles. In some embodiments, the adsorbent media 132 includes layers or combinations of adsorbent material, so that different contaminants are selectively removed as they pass through or by the different adsorbent materials.

The adsorbent media 132 can be a powder (for example, a powder that passes through 100 mesh) or granular material (28 to 200 mesh). Alternately, the adsorbent media 132 can be provided in a form, such as a granule, bead, or tablet that optionally can be shaped. This type of filter media can have a variety of shapes. For example, a shaped adsorbent media 132 can be shaped as a disk, a tablet, a wafer, a cylinder, a parallelepiped, or a cube. The size of the shaped adsorbent media 132 can depend on factors such as, for example, the size of the device in which the filter media is to be used, the volume of fluid to be filtered, the expected lifetime of the filter assembly, and the density of the filter media.

In at least some instances, the shaped filter media substantially retains its shape during the normal or expected lifetime of the filter assembly 100. The shaped adsorbent media 132 can be formed from a free-flowing particulate material combined with a solid or liquid binder that is then shaped into a non-free-flowing article. The shaped adsorbent media 132 can be formed by, for example, a molding (e.g., a compression molding or injection molding), or an extrusion process. The adsorbent media 132 can be disposed, for example, coated or adsorbed, on a substrate.

Preferably the composition of a shaped adsorbent media 132 includes at least about 70%, by weight, and typically not more than about 98%, by weight, adsorbent material. In some instances, the shaped adsorbent media 132 includes 85 to 95%, preferably, approximately 90%, by weight, adsorbent material. The shaped adsorbent media 132 typically includes not less than about 2% by weight, binder and not more than about 30% by weight, binder. Further information regarding mold release, other additives, and molding techniques are discussed in U.S. patent application Ser. Nos. 09/168,698, and 09/353,506, and in U.S. Pat. No. 5,876,487, the entire disclosures of which are incorporated herein by reference.

Figure 5:
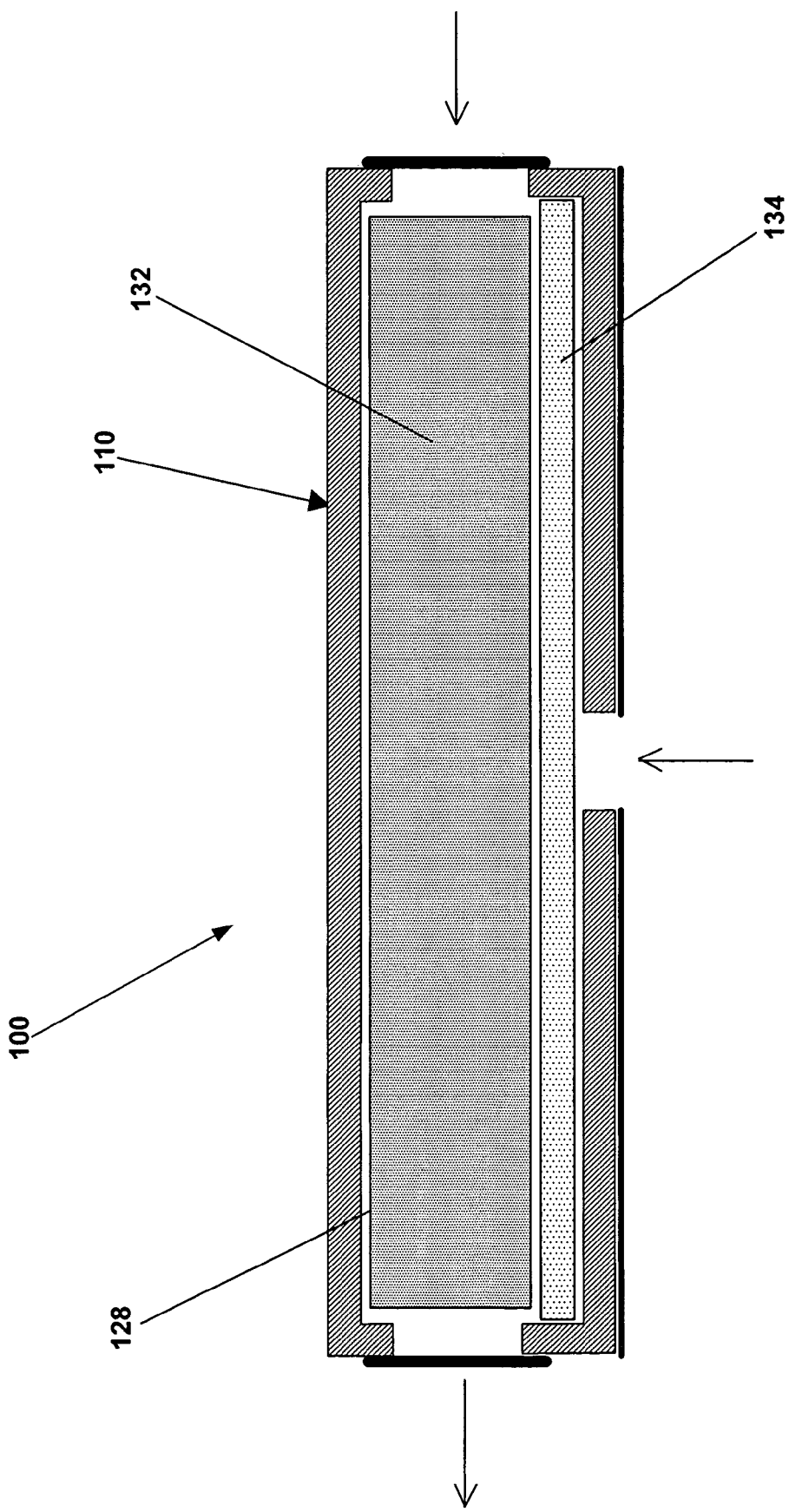
FIG. 5 is a schematic cross-sectional view of a second embodiment of a filter, according to the invention.

In another embodiment, illustrated in FIG. 5, a filter assembly 100 is shown with a porous support layer 134 disposed within the internal volume 128 of the filter housing 110. The adsorbent media 132 is disposed on the porous support layer 134. For example, a mesh or scrim can be used as the porous support layer 134 to hold the adsorbent media 132. Polyester and other suitable materials (such as polypropylene, polyethylene, nylon and PTFE) can be used as the mesh or scrim. The porous support layer 134 can be used as a base on which the adsorbent media 132 is disposed, or the porous support layer 134 can be provided on or around the exterior of a mass of adsorbent media 132 to hold the material together or to prevent or reduce the loss of adsorbent material by, for example, flaking. Optionally, the adsorbent media 132 can be mounted on the porous support layer 134 using, for example, an adhesive.

Typically, any porous support layer 134 is not more than about 40% of the weight of the adsorbent media 132, and is generally about 10 to 20% of the total filter media weight.

Figure 6:
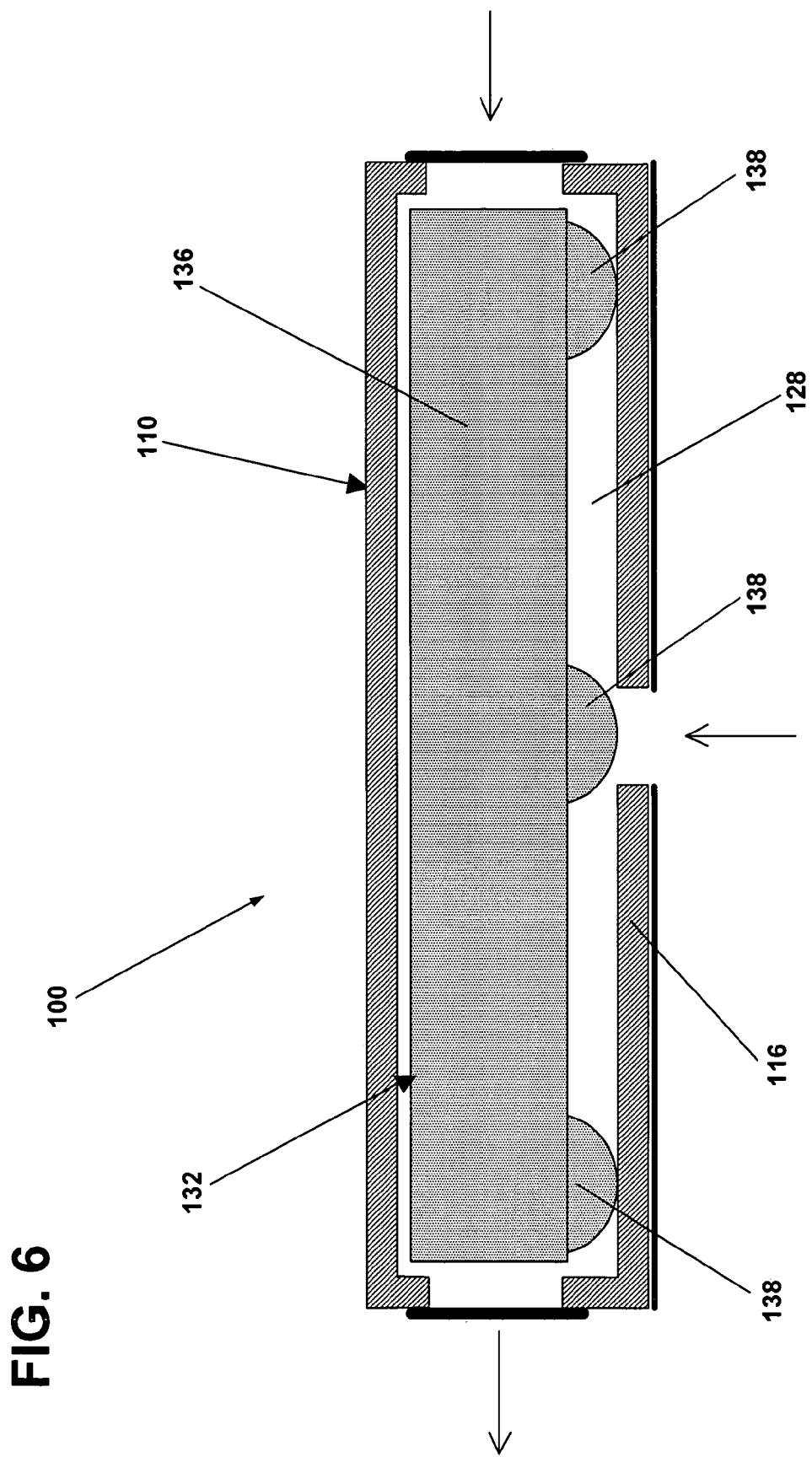
FIG. 6 is a schematic cross-sectional view of a third embodiment of a filter, according to the invention.

Referring to FIG. 6, in another embodiment, an adsorbent media 132 including a main body 136 with at least one projection 138 extending from a surface of the main body 136 is disposed within the internal volume 128 of the filter assembly 100. Typically, the projections 138 are formed (e.g., molded or compression molded) simultaneously with the adsorbent media 132. Examples of filter media with projections are disclosed in U.S. Pat. No. 5,876,487 and U.S. patent application Ser. No. 09/353,506, both of which are incorporated herein by reference.

In some instances, the adsorbent media 132 includes at least four, six or more projections 138 on at least one surface of the main body 136. Other embodiments include a single projection on one or more surfaces of the main body. In some instances, projections 138 are provided on two surfaces of the main body, for example, on two opposing surfaces. The projections 138 can be distributed uniformly, according to a pattern, or randomly on a surface of the main body 136. In some embodiments, all of the projections 138 are provided around a peripheral edge of the main body 136.

The projections 138 can have a variety of shapes. For example, the projections can be hemispheres, cylinders, cones, truncated cones, cubes, parallelepipeds, or other geometrically regular or irregular shapes. All of the projections 138 on the adsorbent media 132 can have the same shape or there can be two or more types of differently shaped projections 138. The cross-sectional dimensions (e.g., length, width, and/or diameter) of the projections 138 can depend on factors such as, for example, the size of the shaped adsorbent article, the size of the surface from which the projections extend, the number of projections, and the desired amount of filtering. The distance separating the projections can depend on, for example, the density of the projections on the surface, the size of the surface, the size and shape of the projections, and the arrangement of the projections.

The distance that the projections 138 extend from the main body 136 can vary over a wide range. The distance is typically large enough to allow a fluid, such as air, to flow between the projections 138, yet still make sufficient contact with the main body 136 and projections 138 to produce a desired amount of filtering.

The projections 138 define, at least in part, a path for flow of air (or another fluid) between the filter housing 110 and the main body 136 of the adsorbent media 132. The path defined at least in part by the projections 138 is typically around and between the projections 138. This configuration can allow air to flow more freely through the filter assembly as compared to using a shaped adsorbent article without projections.

Air, as well as contaminants carried by air, are in contact with the surface of the adsorbent media 132. This permits the adsorbent media 132 to filter the air by adsorbing contaminants. It is thought, although not necessary to the invention, that most of the air does not travel through the shaped adsorbent article, but rather around the article. It is also thought that the contaminants are adsorbed on the surface of the shaped adsorbent article and then diffuse into the interior of the article. In contrast, a powdered or granular filter media typically allows fluid to flow through or between particles of the filter media.

In addition to providing a path for fluid flow around the adsorbent media 132, the projections 138 can also provide an increased surface area for interaction with the fluid. The increase in surface area is typically related to factors, such as, for example, the number of projections, their cross-sectional area, the distance the projections extend from the main body, and the shape of the projections. The projections 138 can also provide obstacles to the direct flow of air over the surface of the shaped adsorbent article and can redirect air flow (e.g., by producing eddy currents) toward that surface, thereby increasing filter efficiency.

Figure 7:
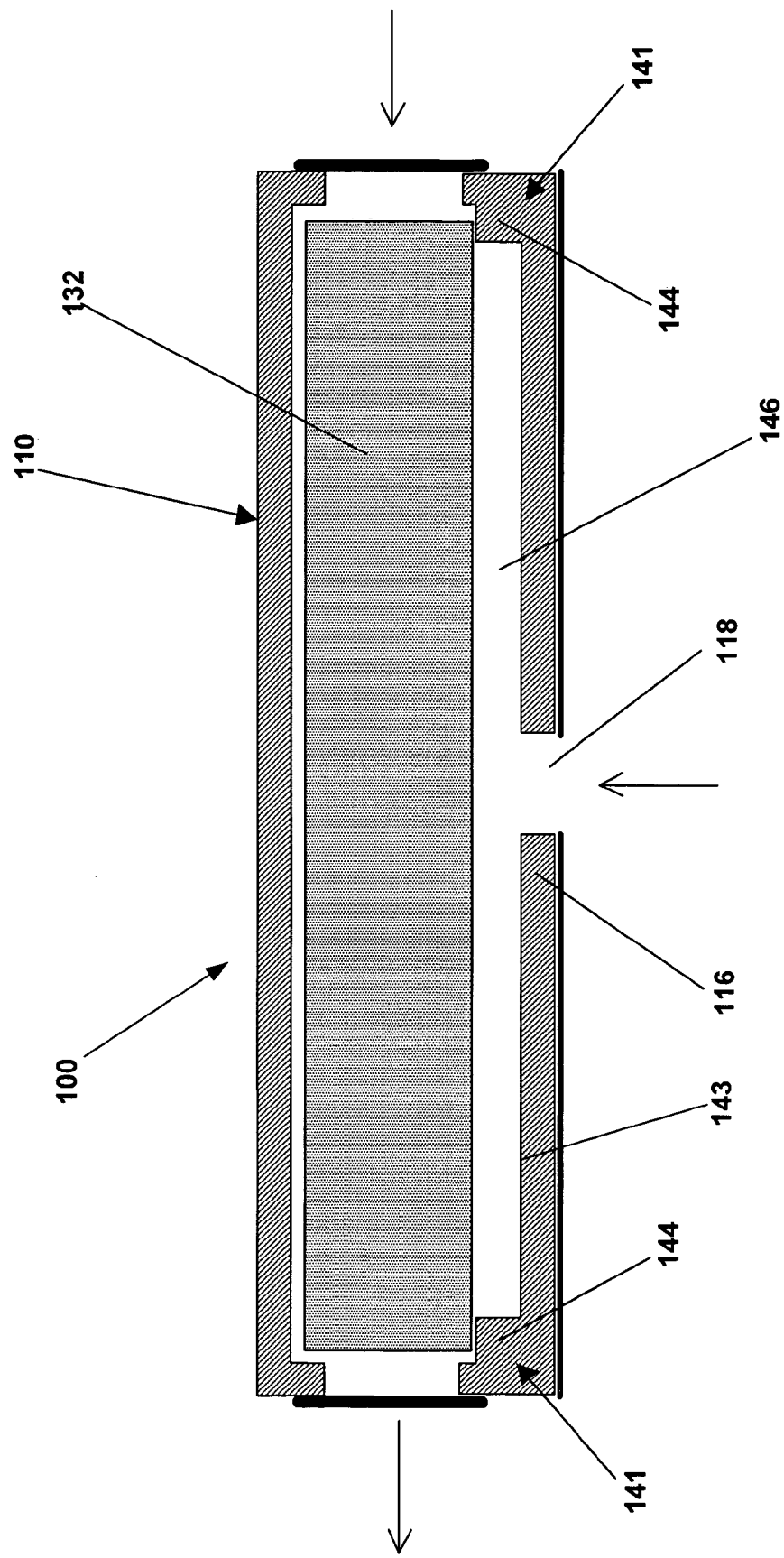
FIG. 7 is a schematic cross-sectional view of a fourth embodiment of a filter, according to the invention.

Referring to FIG. 7, in another embodiment, a filter housing 110 of a filter assembly 100 includes a support structure 141 that raises an adsorbent media 132 away from a top surface 143 of the base 116. For example, as shown in FIG. 7, the housing support structure 141 can include raised edges 144 and the adsorbent media 132 can be mounted on the raised edges 144. Alternatively, a porous support layer can be mounted on the raised edges with the filter media mounted on the support layer. Raising the adsorbent media 132 away from the top surface 143 of the base 116 creates a space 146 defined by the adsorbent media 132 and the housing 110. The raised edges 144 allow air to enter the space 146 through the breather port 118 and increases the surface area in contact with the fluid entering the space compared with, in some embodiments, the adsorbent media 132 being mounted directly on the base 116.

Base and Diffusion Channel Layer

Figure 8A:
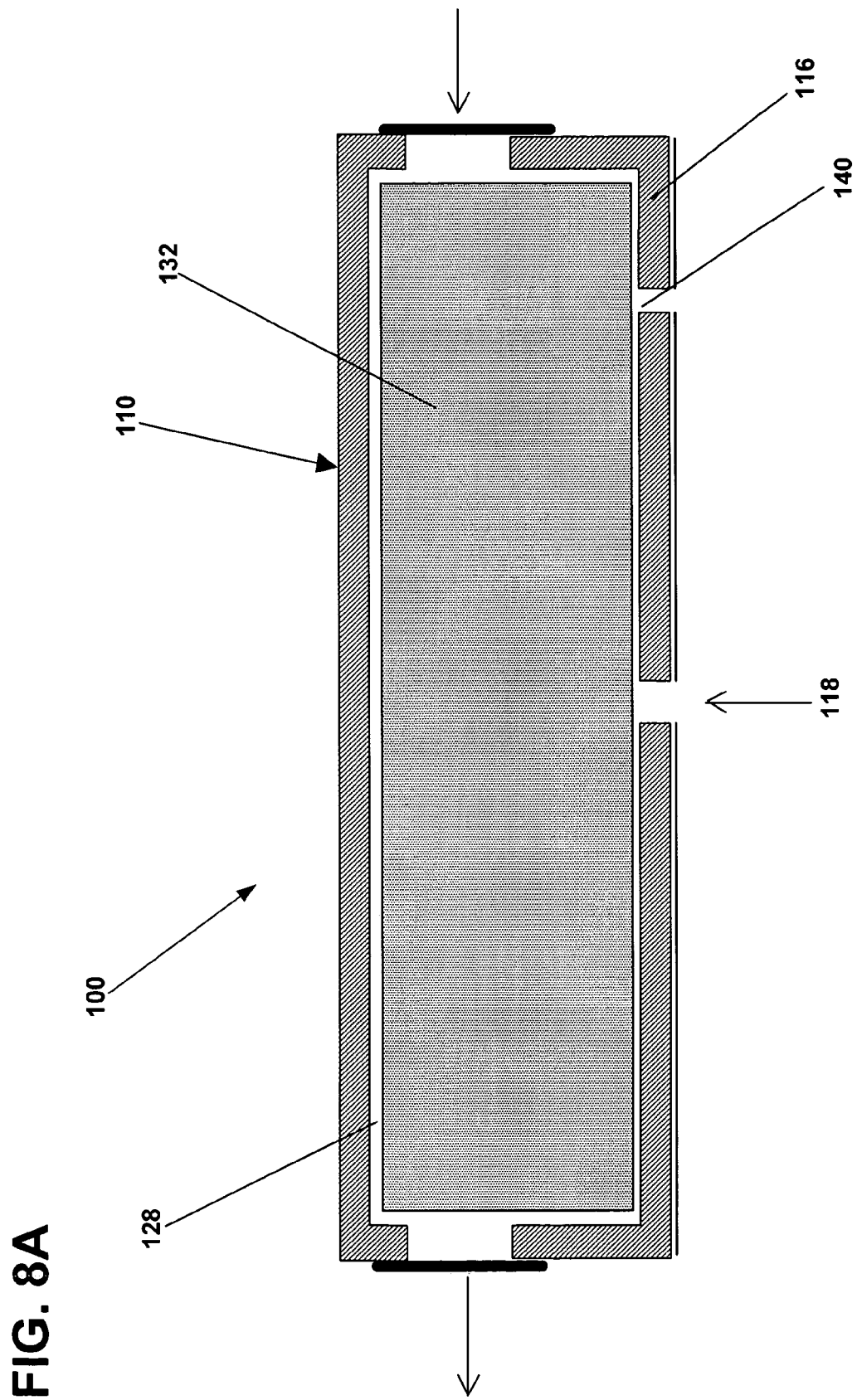
FIG. 8a is a schematic cross-sectional view of a fifth embodiment of a filter, according to the invention.
Figure 8B:
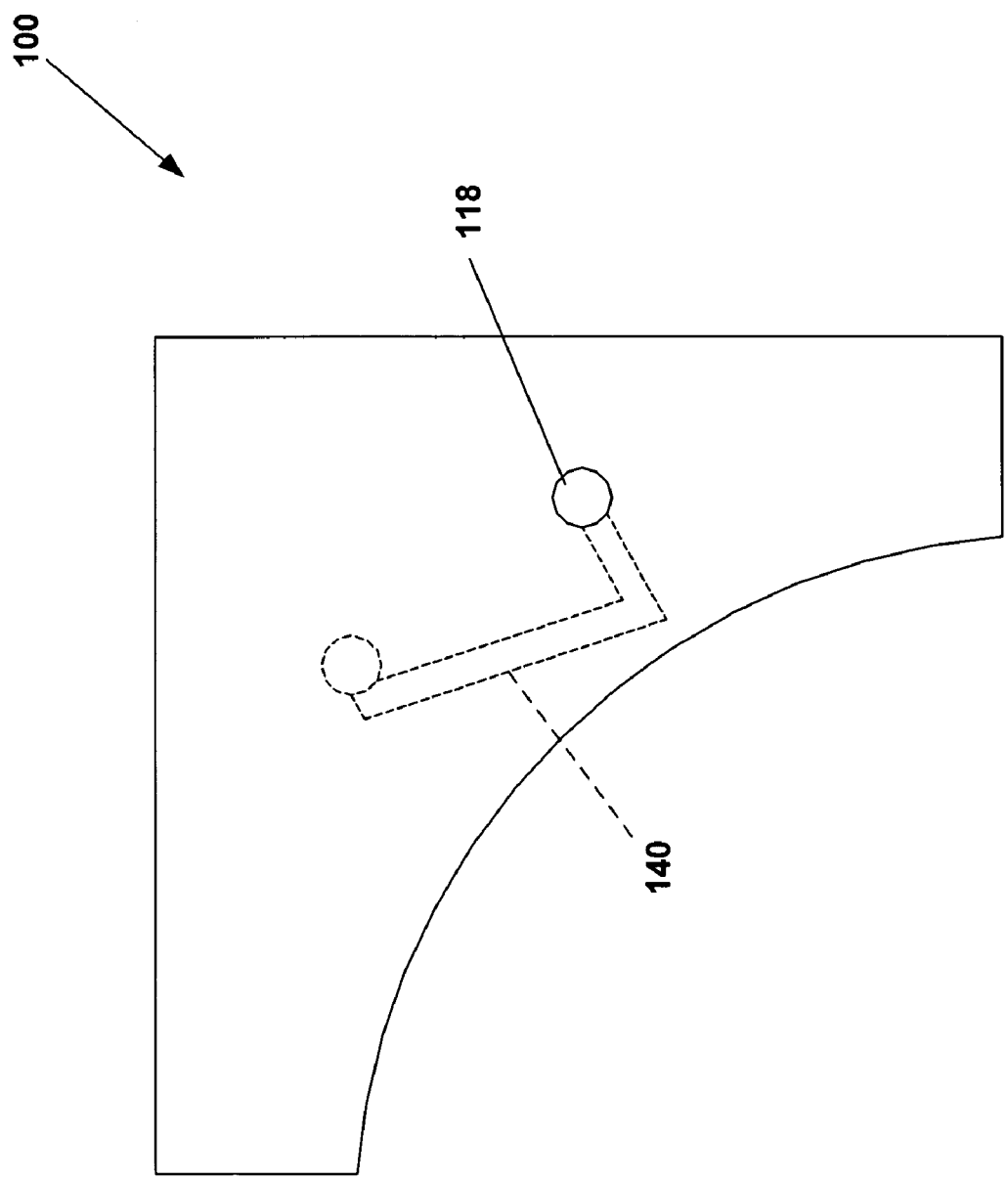

Referring to FIGS. 8A and 8B, in one embodiment, the filter assembly 100 includes a base 116 defining the incoming breather port 118. Fluid enters the internal volume 128 of the housing 110 through the breather port 118 to remove contaminants.

In some embodiments, the base 116 defines a diffusion channel 140 as the breather port 118. The diffusion channel 140 provides an extended length of passage. The diffusion channel 140 can be formed as a straight or curved path. Alternatively, the diffusion channel 140 may be formed to have a more complex path, such as a winding path or a spiral path. For example, the diffusion channel can be configured as an inwardly spiraling channel, an outwardly spiraling channel, or as a maze-like configuration. The diffusion channel 140 can, in some embodiments, have two or more branches. Examples of a diffusion channel for use with computer disk drive systems is described in U.S. Pat. No. 4,863,499, incorporated herein by reference. Other examples of a diffusion channel defined by a diffusion channel layer of film are described in U.S. Pat. No. 5,997,614, incorporated herein by reference. FIG. 8b shows a bottom view of the filter shown in FIG. 8a. Air comes in a breather port 118 and travels through diffusion channel 140 and then into the filter housing. Air can also travel through this pathway in the reverse direction depending on relative air pressure.

Figure 9:
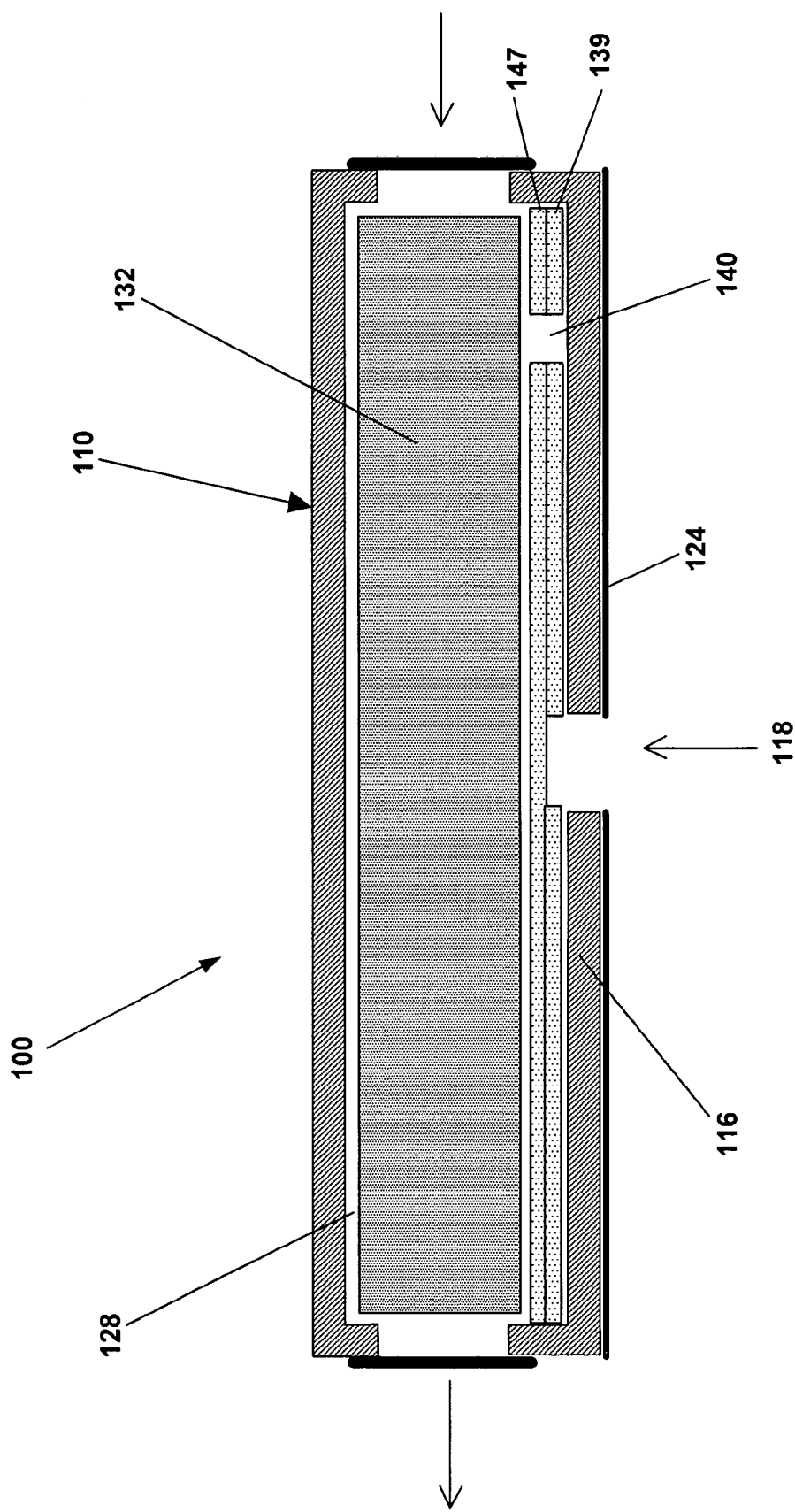
FIG. 9 is a schematic cross-sectional view of a sixth embodiment of a filter according to the invention.

In one embodiment illustrated in FIG. 9, the base 116 includes a diffusion channel layer 139. The diffusion channel layer 139 defines the diffusion channel 140. In an embodiment the diffusion channel layer is an adhesive or adhesive laminate.

The boundary layer 147 can be formed using a polymer or metallic film or a plastic layer. The layer is typically nonporous and has a low permeability to the fluid to be filtered, particularly, at the fluid pressures expected for operation of the filter assembly 100.

Examples of suitable polymer films for use in the boundary layer 147 include polyester (e.g., Mylar™), polyethylene, polypropylene, nylon, polycarbonate, polyvinyl chloride, and polyvinyl acetate films. Preferably, the polymer films have relatively low or no out-gassing.

Suitable metallic films for use in the diffusion boundary layer 147 include films formed using metals, such as, for example, copper and aluminum, and alloys, such as, for example, stainless steel. Preferred metal films do not significantly corrode or form reaction products (e.g., rust) that can be dislodged from the film under the expected operating conditions of the filter. In some embodiments, the metallic film may be deposited or otherwise formed on a base material, such as, for example, a polymer film.

Referring again to FIG. 9, in another embodiment, the filter assembly 100 includes the base 116, mounting adhesive 124, a diffusion channel layer 139, a boundary layer 147, and adsorbent media 132, as shown in FIG. 9. A diffusion channel 140 is formed in the diffusion channel layer 139. The base 116 defines a breather port 118 that is aligned with a portion of the diffusion channel 140. Alternatively, the diffusion channel layer can provide the base for the housing. The diffusion channel 140 can be formed by removing a portion of the diffusion channel layer 139. Alternatively, the side of the base opposite the interior volume is patterned (e.g., molded) to form a diffusion channel.

The boundary layer 147 is typically formed using a polymer and/or metallic film. The same materials used to form the diffusion channel layer 139 can be used to form the boundary layer 147. The boundary layer 147 is typically non-porous and has a low permeability to the fluid to be filtered.

In operation, the filter assembly 100 is placed over a disk drive port formed through a surface of a disk drive housing or casing of a device. The disk drive port is aligned with at least a portion of the diffusion channel so that air can flow through the disk drive port and into the diffusion channel. Although the disk drive port can be aligned anywhere along the diffusion channel, it is often preferable to align the disk drive port at an end of the diffusion channel opposite the passageway to increase the distance that the fluid travels along the diffusion channel.

Filter Housing and Porous Membrane

Referring to FIG. 3, the filter housing 110 can be any suitable material to provide structural support for the adsorbent media 132 and can be constructed of any material, in any size or shape, to achieve a desired filtering of the fluid within the disk drive. The housing 110 can be a molded, cast, or an otherwise shaped element. In one embodiment, the housing 110 is made of a non-porous material that prohibits the flow of fluid through the housing material, which limits fluid flow to the inlet port 112, outlet port 114, and the breather port 118.

In some embodiments, a microporous membrane 130 is disposed over the inlet port 112, outlet port 114, or both and has a filtering function, for example, the membrane can be a particulate or solid contaminant removal element. In one embodiment, the microporous membrane 130 is a polytetrafluoroethylene (PTFE) membrane.

Figures 10A, 10B:
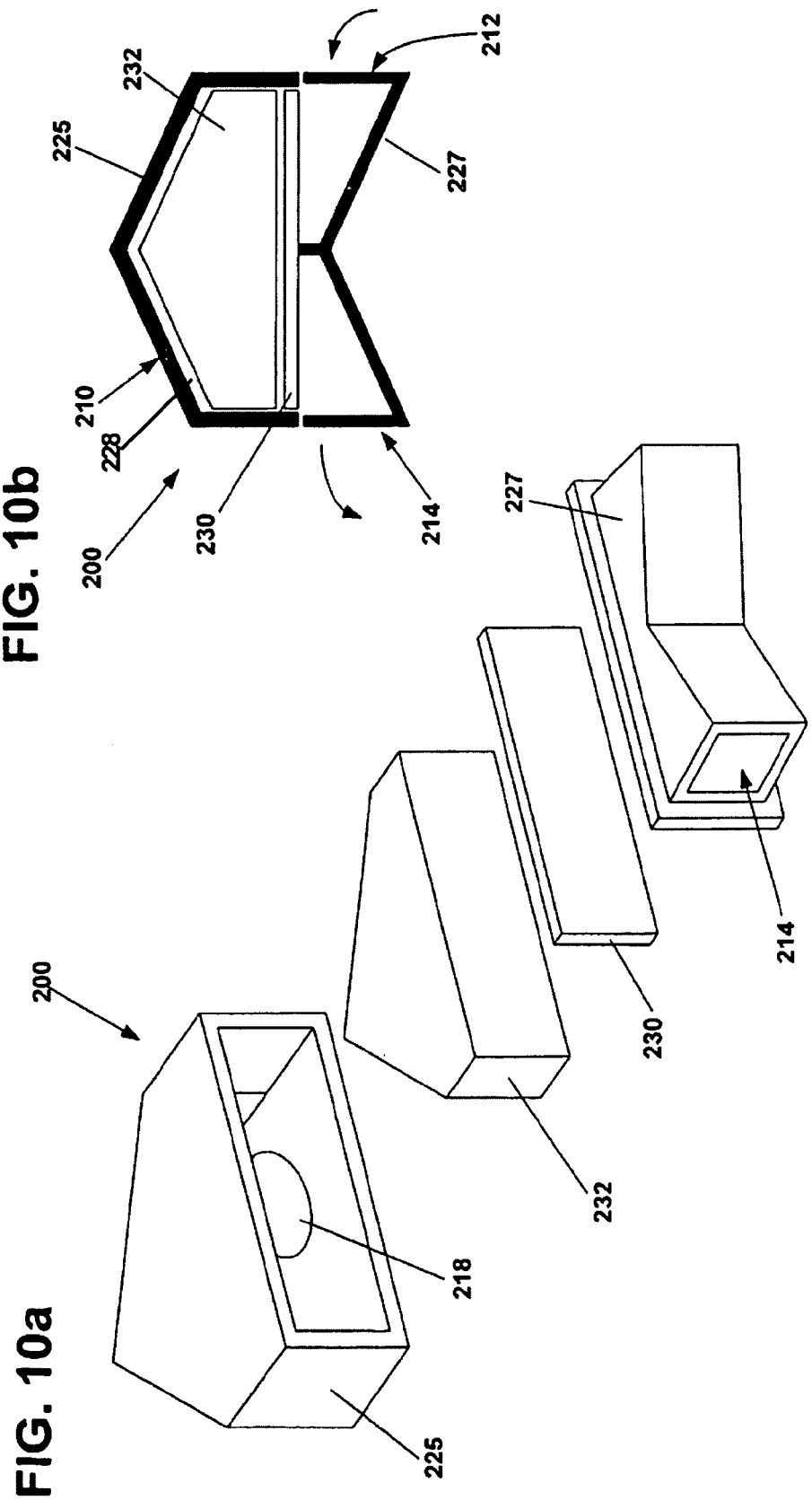
FIG. 10a is a schematic exploded view of a seventh embodiment of a filter, according to the invention.
FIG. 10b is a schematic top cross-sectional view of the filter of FIG. 10a, according to the invention.

The filter housing 110 can be constructed in many different configurations to achieve filtering of fluid within the disk drive. FIGS. 1 and 2 show one embodiment of the filter housing 110. In another embodiment, shown in FIGS. 10a and 10b, the filter housing 210 includes a body 225 and a shroud 227 constructed of non-porous material. The shroud 227 defines the inlet port 212 and the outlet port 214 with the profile of the shroud directing fluid into and out of the filter 200. The body 225 defines the breather port 218 for the breather aspect of the filter 200. A porous support material 230, typically PTFE or other electrostatic media, and the body of the housing 210 define the internal volume 228 of the housing 210. The filter media 232 is disposed within the internal volume 228 of the housing 210. The porous support material 230 can be adhered, welded, or otherwise attached to the shroud 227 or the body 225 and the shroud can be adhered, welded, or otherwise attached to the body 225.

Figure 11:
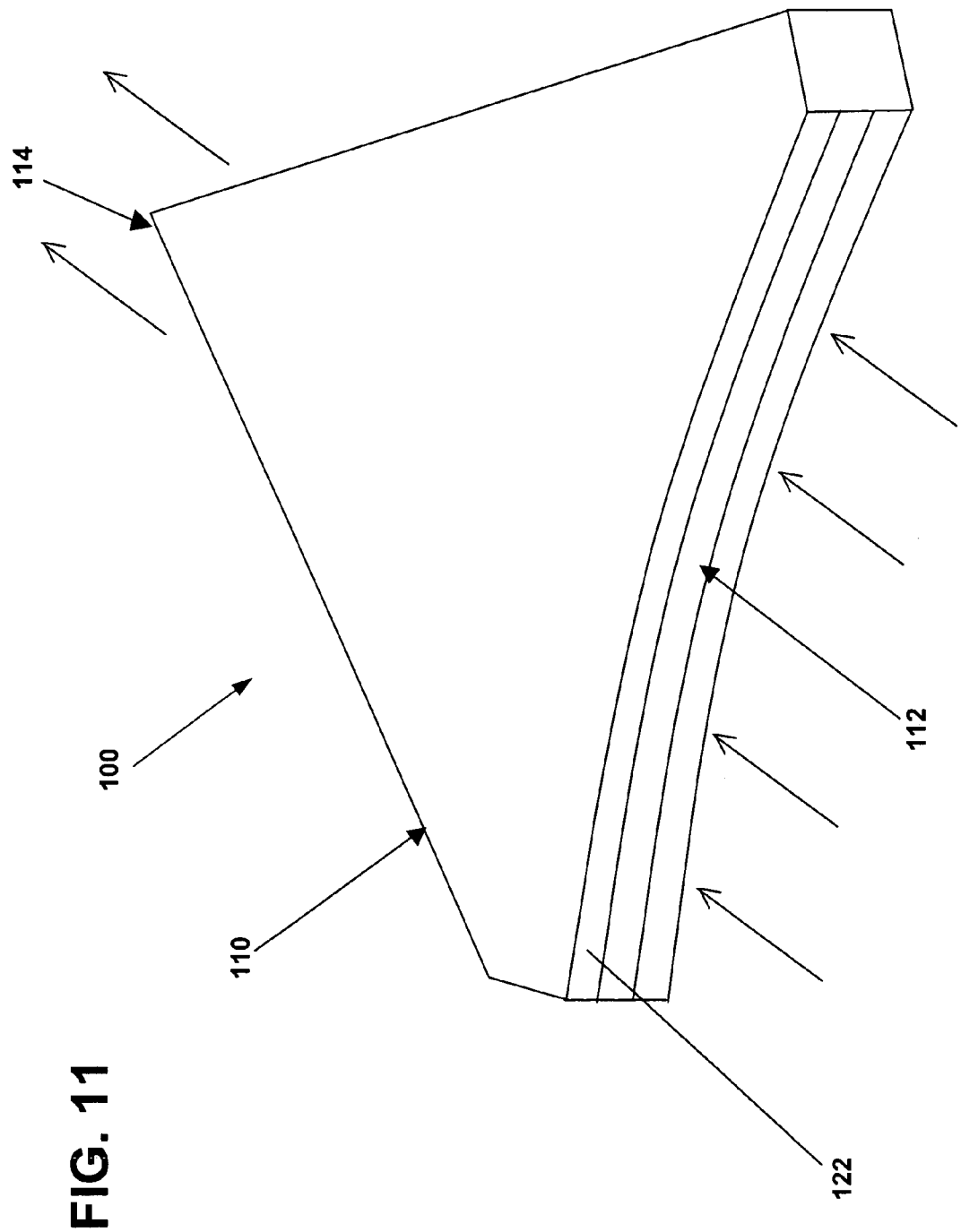
FIG. 11 is a schematic top perspective view of an eighth embodiment of a filter, according to the invention.

Referring to FIG. 11, an alternative embodiment of the filter assembly 100 is shown where a sidewall 122 of the filter housing 110 defines an inlet port 112. Arrows on FIG. 11 depicts air flowing through the inlet port 112, entering the filter assembly 100, and exiting out filter of the housing 110 through an outlet port 114. Optionally, a microporous membrane (not shown) can be disposed over the inlet port 112 and the outlet port 114. Although FIG. 11 shows fluid entering the filter at a particular location on the filter, the filter housing can define the inlet port to be located at any position on the housing. The filter housing can also define one or more outlet ports that are located at any position on the filter housing and can be constructed to any size or shape. For example, the filter can be constructed to define an outlet port that is defined by any portion of the housing 110. Further, the filter can be constructed with the disk drive housing defining the outlet port.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

What is claimed is:

1. A filter comprising:
a housing having a top, a base, and at least one sidewall extending from the top to the base, the housing defining an inlet port and an outlet port through the at least one sidewall, and a breather port in the base, the housing further defining an internal volume;
a microporous membrane disposed over at least one of the inlet port and the outlet port; and
adsorbent filter media disposed within the internal volume of the housing, the housing defining a first path for flow of fluid through the breather port in the base to the filter media and a second path for flow of fluid through the inlet port, into contact with the filter media, and out the outlet port.

2. The filter of claim 1, wherein the adsorbent is mounted within the housing.

3. The filter of claim 1, wherein the housing comprises a non-porous material.

4. The filter of claim 1, wherein a microporous membrane is disposed over the inlet port and the outlet port.

5. The filter of claim 1, wherein the microporous membrane comprises a polytetrafluoroethylene membrane.

6. The filter of claim 4, wherein each microporous membrane comprises a polytetrafluoroethylene membrane.

7. The filter of claim 1, further comprising a mounting adhesive disposed on the base.

8. The filter of claim 1, wherein the base comprises a diffusion channel layer defining a diffusion channel as at least a part of the path for fluid flow through the breather port to the filter media.

9. The filter of claim 1, wherein the filter media comprises carbon filter material.

10. The filter of claim 1, further comprising a porous support layer disposed within the internal volume.

11. The filter in claim 10, wherein the filter media is mounted on the porous support layer.

12. A device, comprising: a housing having a top surface, a base, and at least one sidewall extending from the top surface to the base, the housing defining an inlet port and an outlet port, a breather port, and an internal volume;
a microporous membrane disposed over at least one of the inlet port and the outlet port;
mounting adhesive disposed on the base;
filter media disposed within the internal volume of the housing;
a diffusion channel layer defining a diffusion channel, the filter media disposed in fluid communication with the diffusion channel;
the filter defining a first path for flow of fluid through the breather port and diffusion channel into contact with the filter media; and
the filter defining a second path for flow through the inlet port, into contact with the filter media, and out the outlet port.

13. An electronic enclosure assembly comprising:
(a) an enclosure defining a vent opening;
(b) a disk rotatably mounted within the enclosure; and
(c) a filter construction positioned within the enclosure, the filter construction comprising:
(i) a housing having a top, a base, and at least one sidewall extending from the top to the base, the housing defining an inlet port and an outlet port through the at least one sidewall, and a breather port in the base wherein the breather port is disposed over the vent opening of the enclosure, the housing further defining an internal volume;
(ii) a microporous membrane disposed over at least one of the inlet port and the outlet port; and
(iii) adsorbent filter media disposed within the internal volume of the housing, the housing defining a first path for flow of fluid through the breather port in the base to the filter media and a second path for flow of fluid through the inlet port, into contact with the filter media, and out the outlet port.

14. The electronic enclosure assembly of claim 13, wherein the base comprises a diffusion channel layer defining a diffusion channel as at least a part of the path for fluid flow through the breather port to the filter media.

15. A method of removing contaminants from an electronic enclosure assembly, the method comprising:
(a) positioning a filter construction within a disk drive assembly having a vent opening, the filter construction comprising:
(i) a housing having a top, a base, and at least one sidewall extending from the top to the base, the housing defining an inlet port and an outlet port through the at least one sidewall, and a breather port in the base wherein the breather port is disposed over the vent opening of the disk drive assembly, the housing further defining an internal volume;
(ii) a microporous membrane disposed over at least one of the inlet port and the outlet port; and
(iii) adsorbent filter media disposed within the internal volume of the housing, the housing defining a first path for flow of fluid through the breather port in the base to the filter media and a second path for flow of fluid through the inlet port, into contact with the filter media, and out the outlet port;
(b) filtering an incoming air stream with the adsorbent filter media, the incoming air stream entering the disk drive assembly through the vent opening; and
(c) filtering an internal air current with the adsorbent filter media, the internal air current moving within the disk drive assembly, entering the internal volume of the housing through the inlet port, and exiting through the outlet port.

16. The method according to claim 15, wherein the step of positioning a filter construction at least partially within a disk drive assembly comprises positioning the filter construction within the disk drive assembly wherein the filter construction comprises a diffusion channel between the breather port and the internal volume of the housing.

17. The method according to claim 15, wherein the step of filtering an internal air current with the adsorbent filter media comprises:
(a) filtering an internal air current with the adsorbent filter media, the internal air current circulating within the disk drive assembly.

* * * * *